Patented Apr. 18, 1944

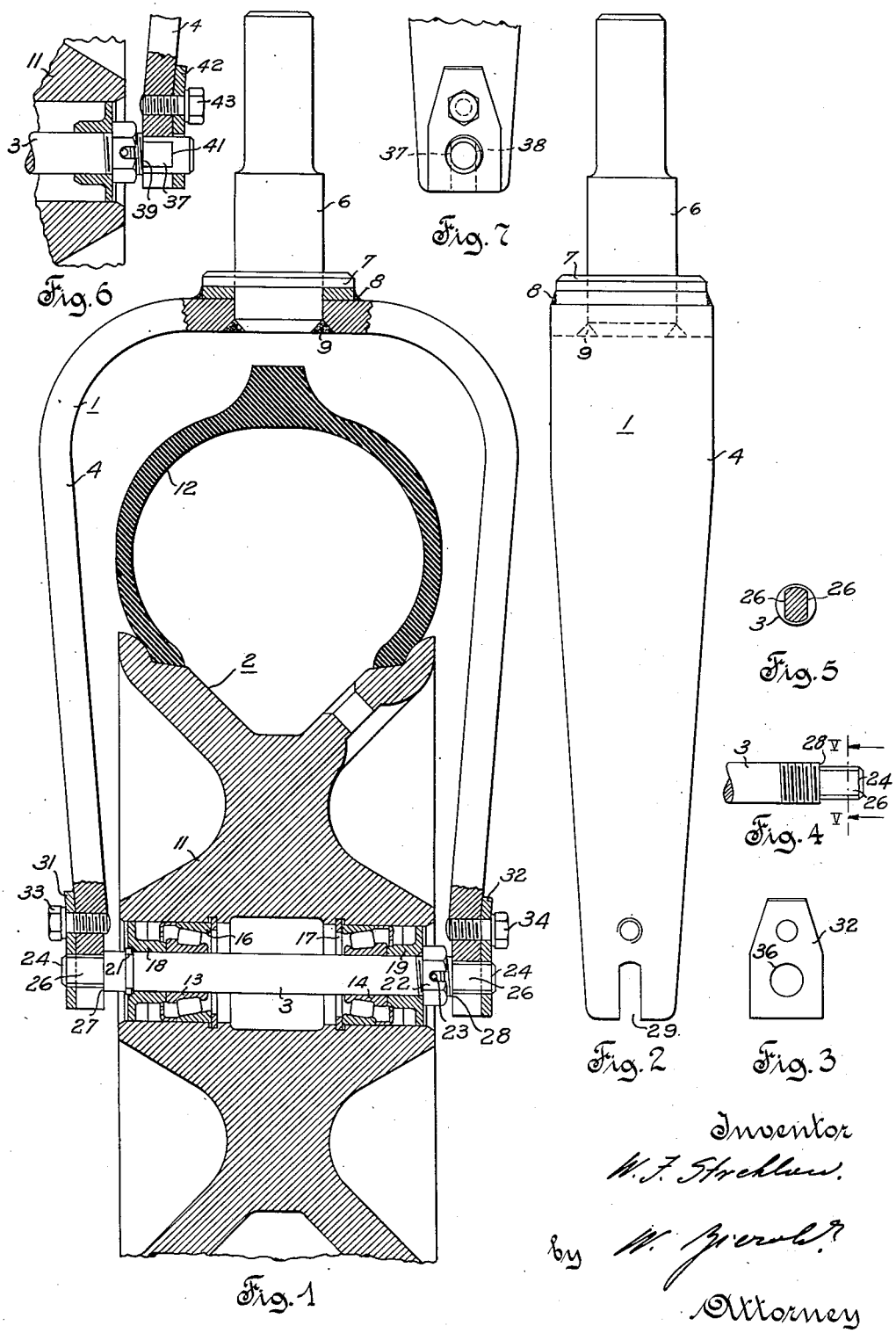

2,346,950

UNITED STATES PATENT OFFICE 2,346,950

WHEEL MOUNTING

Walter F. Strehlow, Wauwatosa, Wis., assignor to Allis-Chalmers Manufacturing Company, Milwaukee, Wis., a corporation of Delaware Application July 24, 1941, Serial No. 403,804

6 Claims. (Cl. 301—1)

The invention relates to wheel mountings, and particularly to wheel mountings of the type in which an axle carrying a wheel is mounted on a bifurcated support straddling the wheel. More specifically the invention relates to a wheel mounting of the mentioned character in which the axle has a separable connection with the bifurcated support to permit relative displacement of the axle and support in a direction transversely of the axle so that the axle and wheel may be installed as an assembled unit on the support and may likewise be removed therefrom as an assembled unit.

In order to accomplish the mentioned purpose of installing an assembled axle and wheel unit on and removing it from a bifurcated support, it has heretofore been common practice to form a pair of open ended slots in the legs of the support into which slots the axle may be slid and from which it may be withdrawn in a direction transversely of its axis, and to secure the axle on the support against axial displacement relative thereto by means of a pair of nuts which are screwed upon threaded stubs at the ends of the axle.

It is an object of the invention to provide a detachable wheel mounting which permits ready installation of an assembled axle and wheel unit on, and its removal from a bifurcated support, and in which the axle is devoid of threaded stubs and nuts at its ends but nevertheless properly secured against axial, transverse, and also against rotary displacement relative to its support.

Another and important object of the invention is to provide a detachable wheel mounting of such a construction that it may be manufactured at a saving of costs as compared with heretofore employed constructions, specifically those utilizing the mentioned threaded axle stubs and nuts, and to obtain such saving of manufacturing costs without sacrificing strength and other requirements, or features which are desirable from a performance standpoint.

Another object of the invention is to provide an improved detachable wheel mounting for vehicle steering trucks in which a single supporting wheel is mounted in a bifurcated support and in which steering is effected by pivotal adjustment of the support about a substantially vertical axis. Such steering trucks are common used in tractors for farm use which have a single steerable front wheel positioned to run in the space between two plant rows, and the invention specifically contemplates an improved detachable wheel mounting for the steerable front support of a farm or tricycle type tractor.

In order to incorporate the improved detachable wheel mounting in a steering truck of a tricycle type tractor, the invention contemplates to provide an axle and wheel assembly in which the axle is devoid of threaded stubs and nuts at its ends and is rotatably mounted within the wheel, and in which the wheel and axle are suitably secured against axial displacement relative to each other, preferably by a pair of conical roller bearings. The axle and wheel assembly is detachably mounted in a bifurcated support comprising a yoke and a steering spindle rigidly secured to the bight of the yoke, the steering spindle providing a journal by means of which the support may be mounted on the tractor for rotary steering movements about a substantially vertical axis. The yoke straddles the wheel and has a pair of open-ended slots at the ends of its legs into which slots the axle may be slid and from which it may be withdrawn in a direction transversely of its axis. The slots are preferably arranged to extend longitudinally of the legs, that is, substantially vertically on the tractor, so that the axle and wheel assembly may be separated from the yoke by jacking up the body of the tractor while the wheel stays on the ground. The wheel is usually weighted and comparatively heavy, and the mentioned arrangement of the slots permits installation of the axle and wheel unit on the tractor and its removal therefrom without lifting the wheel. Provisions for releasably securing the axle against transverse movement out of the slots are made in a simple and inexpensive manner by means of a pair of side members which have apertures receiving portions of the axle laterally of the legs, and which side members are suitably connected with the legs of the yoke to resist transverse movement of the axle out of the slots, and to permit release of the axle for such transverse movement. For instance, a pair of flat plates may be bolted to the sides of the legs, each plate having an aperture embracing a portion of the axle laterally of the respective leg, the plates being so positioned relative to the slots that contact of the axle with edge portions of the apertures prevents transverse movement of the axle out of the slots, and the holes in the plates being dimensioned so that closed ends of the slots may bear upon the axle. In this manner the axle may conveniently be secured, substantially without radial play, against movement transversely of its axis relative to the yoke.

In order to secure the axle against axial displacement in opposite directions relative to the support a pair of shoulders are formed on the axle at a fixed axial distance from each other, the shoulders being accurately spaced from each other for cooperation with adjacent portions of the support so that any axial thrust forces to which the axle may be subjected in operation of the tractor may be taken up by the support substantially without axial play of the axle relative to the support. The shoulders are formed, according to the invention, by providing a circumferentially recessed and laterally flattened portion, near each end of the shaft, for reception within the slot of the adjacent leg of the yoke. In this manner axial thrust surfaces of relatively large area are formed on the shaft without unduly weakening or complicating the latter.

The yoke is preferably made of plate metal by bending a blank, which is sheared from or burned out of plate stock. The slotted ends of the plate metal yoke may conveniently be connected with the axle in such a manner as to prevent substantial widening or narrowing of the leg spacing of the yoke. In order to accomplish this result circumferentially recessed and laterally flattened portions are formed, as mentioned hereinbefore, at opposite ends of the axle, but at a distance from the end faces of the axle, so as to form a portion of reduced thickness between two shoulders at each end of the axle for reception in the slots of the yoke. The axial length of each axle portion of reduced thickness corresponds to the thickness of the slotted ends of the yoke, so that each leg of the yoke is retained substantially without lateral play, between shoulders on the axle.

The foregoing and other objects and advantages of the invention will become more fully apparent from the following description of several embodiments of the invention illustrated in the accompanying drawing. Referring to the drawing, in which like reference characters designate the same or similar parts in the several views:

Fig. 1 is a sectional front view of a steerable fork and wheel unit for a tricycle type tractor;

Fig. 2 is a side view of the wheel fork shown in Fig. 1;

Fig. 3 is a detail view of a retainer for the axle of the unit shown in Fig. 1;

Figs. 4 and 5 are detail views of one end of the axle shown in Fig. 1, Fig. 5 being a section on line V—V of Fig. 4; and Figs. 6 and 7 are sectional and side views, respectively, of a modified connection between the wheel fork and axle shown in Fig. 1.

The fork and wheel unit shown in Fig. 1 comprises a bifurcated support 1, and a wheel 2 which is mounted on the bifurcated support 1 by means of an axle 3. A yoke 4 which forms part of the bifurcated support 1 is made of plate metal of substantial thickness, by first cutting a blank of suitable shape from plate stock, or burning it out of such plate stock, and by then bending the blank into the shape shown in Fig. 1. The yoke 4 has a pair of legs at opposite sides of the wheel 2, and a steering spindle 6 is secured in a top opening of the yoke 4. A thrust washer 7 surrounding the lower end of the steering spindle 6 is secured to the yoke by a welded connection 8, and a fillet weld 9 connects the spindle 6 with the yoke 4 at the hole in the upper part of the yoke. The steering spindle 6 is suitably shaped for mounting in a vertical bearing on a tractor, not shown, and suitable mechanism, not shown, may be connected with the spindle 6 for rotating it about its axis in order to steer the tractor to the right or left.

The wheel 2 comprises a relatively heavy wheel body 11 in the form of a casting, and a pneumatic tire 12 surrounding the wheel body 11.

The axle 3 extends through the hub of the wheel body 11 which is rotatably mounted on the axle by means of a pair of conical roller bearings 13 and 14. Snap rings 16 and 17 within the hub of the wheel body 11 afford abutments for the cups of the bearings 13 and 14, and a pair of bearing spacers 18 and 19 on the axle 3 abut the cones of the bearings 13 and 14, respectively, at the axially outer sides of the latter. The bearing spacer 18 is seated against a spring ring 21 on the axle 3, and the bearing spacer 19 is drawn up against the cone of the bearing 14 by means of a nut 22 which is axially adjustable on a threaded portion of the axle 3 and secured in adjusted position by a cotter pin 23. The nut 22 constitutes an axially adjustable abutment on the shaft 3 intermediate the ends thereof. The axial play of the bearings 13 and 14 may be increased or decreased by rotation of the nut 22 in one direction or the other, and the bearings are adjusted, by adjustment of the nut 22, so as to insure free running of the wheel 2 without appreciable axial play.

The portion of the axle 3 within the hub of the wheel 11 is of circular cross section, and the ends of the axle, at opposite sides of the wheel 2, are circumferentially recessed and laterally flattened to form an end pin 24 on the axle 3 at each end thereof. The pins 24 are formed by first machining the axle in a lathe and then milling flat surfaces 26 on the pins clear to the ends of the axle, as best shown in Figs. 4 and 5. At the junction of the pins 24 with the adjacent axle portions of circular cross section the axle has a pair of shoulders 27 and 28, each of which has a continuous inner edge on the circumferentially recessed and laterally flattened axle portion adjacent thereto.

Formed in the end of each leg of the yoke 4 is an open-ended slot 29, the slots extending longitudinally of the legs and having closed upper ends, as best shown in Fig. 2. The pins 24 of the axle 3 are received within the slots 29 of the yoke, and the flats 26 of the pins cooperate with longitudinal side portions of the slots to prevent rotation of the axle 3 about its axis relative to the yoke 4. The closed ends of the slots 29 are rounded to conform with the curvature at the upper side of the pins 24, and the yoke 4 has vertical bearing contact with the pins 24 at the upper ends of the slots 29.

The shoulders 27 and 28 are spaced on the axle 3 a distance corresponding to the spacing between the inner side surfaces of the legs of the yoke 4, and axial displacement of the axle 3 relative to the yoke 4 is prevented by axial contact of the shoulders 27 and 28 with the adjacent portions of the legs of the yoke. The inner side surfaces at the lower ends of the legs are machined to insure a close fit between the shoulders 27 and 28 and the legs of the yoke 4. It will be noted that the shoulders 27 and 28 have thrust surfaces adapted to bear axially against the inner sides, respectively, of the legs of the yoke 4 at surface portions of the latter extending radially of the axle 3, on each leg, not only from the straight side edges of the slot 29 but also from the curved top edge of said slot. As a result, relatively large axial contact areas between the axle and the yoke are obtained, without unduly weakening the shaft, which large areas will avoid undesirably high unit stresses at the axially contacting portions of the axle and yoke when the tractor is operated on uneven ground or under other conditions subjecting the axle to severe axial thrust forces.

A pair of plates 31 and 32, which form side members of the bifurcated support, are secured to the outer sides of the legs of the yoke 4 by means of a pair of bolts 33 and 34, respectively.

The bolts extend through holes in the plates 31 and 32, and are screwed into tapped holes of the yoke 4, which are located a short distance above the closed ends of the slots 29. The plate 32 has a circular hole 36, as shown in Fig. 3, for reception of a portion of the pin 24 at one side of the yoke 4, and the plate 31 has a similar aperture for reception of a portion of the pin 24 at the other side of the yoke 4. The end portions of the pins 24 fit loosely into the openings 36 of the plates 31 and 32, but the bolts 33 and 34 hold the plates 31 and 32 in such positions relative to the slots 29 that in the assembled unit the axle 3 is retained on the yoke substantially without play against displacement transversely of its axis, the pins 24 being stopped at their upper sides on the closed ends of the slots 29, and at their lower sides on lower edge portions of the holes 36.

In order to remove the axle 3 and wheel 2 as an assembled unit from the bifurcated support, it is merely necessary to remove the bolts 33 and 34, whereupon the yoke 4 may be withdrawn in an upward direction from the axle 3 a sufficient distance to clear the pins 24 of the axle. The wheel 11 may then be rolled away from the yoke 4 on the ground.

Figs. 6 and 7 show a modified connection between the axle 3 and one of the legs of the yoke 4, it being understood that the same modified connection is to be used between the axle 3 and the other leg of yoke 4. In the modified construction a pair of flats 37 and 38 are milled on a circumferentially recessed portion of the round axle 3 at a short distance from the end of the axle so as to form a shoulder 39 and a pair of segmental shoulders 41 at the same side of the wheel 11 and adjacent to the end of the axle at said side. The axial lengths of the flats 37 and 38 are such as to permit the slotted end of the yoke to be slid between the shoulders 39 and 41 at opposite sides of the axle substantially without lateral play, the axial spacing between the shoulders 39 and 41 conforming closely to the thickness of the plate portion of the leg received therebetween. In order to insure an accurate fit, the lower end of the leg of the yoke may be machined at one or both sides. It will be seen that by fitting the axle to both legs of the yoke in the manner shown in Figs. 6 and 7, the axle functions to substantially prevent widening and narrowing of the leg spacing of the yoke. The outer end portion of the axle 3 shown in Figs. 6 and 7 is received in a retainer plate 42 which is similar to the retainer plate 32, and which plate 42 is secured to the leg of the yoke 4 by means of a bolt 43, corresponding to the bolt 34. The portion of the axle 3 between the shoulders 41 and the end face of the axle is of circular cross section, and the hole in the plate 42 for the reception of the outer round end portion of the axle 3 is sufficiently large to permit a loose fit of the round end portion of the axle 3 therein. In the modified construction the axle has, near each end thereof, a circumferentially recessed portion cylindrical at its axially outer end and laterally flattened from opposite sides at its axially inner end by the milled surfaces 37 and 38, the milling of these surfaces providing the two outer segmental shoulders 41 intermediate the ends of the circumferentially recessed portion of the axle. The inner shoulder 39 has a continuous inner edge on the laterally flattened end of said circumferentially reduced axle portion and a continuous outer edge on the portion of the axle adjacent thereto. The yoke 4 bears upon the upper side of the circumferentially reduced and laterally flattened axle portion, and the cylindrical outer end of the circumferentially reduced axle portion is stopped at its lower side on the lower edge portion of the hole in the plate 42 to secure the axle against transverse movement substantially without play. Rotation of the axle about its axis relative to the bifurcated support is prevented by cooperation of the flats 37 and 38 with longitudinal edge portions of the slots in which the non-circular axle portion between the flats 37 and 38 and shoulders 39 and 41 is received at the lower end of the yoke.

It will be further noted that in the modified construction the axle 3 has two shoulders 39 which, like the shoulders 27 and 28 of the construction shown in Fig. 1, are formed to abut the inner sides of the legs of the yoke 4 at surface portions of the latter extending radially of the axle, on each leg, not only from the straight side edges of the slot 29 but also from the curved top edge of said slot. The outer segmental shoulders, which prevent spreading of the yoke and are not subject to such severe axial thrust forces as the shoulders 39, are formed to abut the outer sides, respectively, of the yoke at surface portions of the latter extending radially of the axle, on each leg, from the straight side edges only of the slot 29.

The modified connection shown in Fig. 6 permits installation of the axle and wheel unit on the yoke 4 and its removal therefrom, in a simple and convenient manner, the same as discussed hereinbefore in connection with Fig. 1, which will be apparent without further explanation.

The nut 22 is screwed upon an externally threaded portion of the axle 3, as stated, intermediate the shoulders 27 and 28, and it is locked in adjusted position by a cotter pin 23. At one side of the threaded axle portion, that is, at the side which in Figs. 1 and 4 is to the right, the axle is reduced in diameter, by the formation of the pin 24, and in the modified construction shown in Fig. 6 the axle is similarly reduced in diameter at the right side of the threaded portion carrying the adjusting nut for the roller bearings. In order to disassemble the axle and wheel unit, after it has been removed from the yoke 4, the cotter pin 23 is withdrawn, and the nut 22 is unscrewed from the threaded axle portion, whereupon the nut may be freely moved longitudinally of the axle, over the pin 24. In other words, the nut does not have to be screwed over a long threaded portion of the axle, and the yoke 4 has no vertical load bearing contact with any of the threads over which the nut 22 must be moved in assembling or disassembling the axle and wheel unit. The nut 22, therefore, does not have to be screwed over any threads which are exposed to pounding and ruination by the yoke 4, and the construction shown in Figs. 1 to 5, as well as the construction shown in Figs. 6 and 7, will insure proper running of the nut 22 on the threaded axle portion, whenever it is desired to remove it from or install it on the axle.

While in the foregoing two preferred embodiments of the invention have been described in detail with reference to the drawing, it should be understood that it is not intended to limit the invention to the exact details of construction explained hereinbefore, for numerous modifications within the scope of the appended claims may occur to persons skilled in the art.

It is claimed and desired to secure by Letters Patent:

1. In a detachable wheel mounting, a wheel, an axle extending through said wheel and having, near each end thereof, a circumferentially recessed and laterally flattened portion and an inner and an outer shoulder at the axially inner and outer ends, respectively, of each of said axle portions, each of said inner shoulders having a continuous inner edge on the circumferentially recessed and laterally flattened axle portion adjacent thereto, a plate metal yoke having open-ended slots in its ends straddling said circumferentially recessed and laterally flattened axle portions and cooperating therewith to secure said axle against rotation about its axis relative to said yoke, said slotted ends of said yoke also cooperating with said inner and outer shoulders to prevent substantial widening and narrowing of the leg spacing of said yoke; means including locking elements connected, respectively, with the legs of said yoke and cooperating with said axle, for releasably locking said axle against transverse movement out of said slots; and bearing means independent of said yoke, cooperating with said wheel and axle to retain said wheel and axle rotatably upon and in axially fixed position relative to each other, said bearing means including an axially adjustable abutment threaded upon a portion of said axle intermediate said inner shoulders thereof.

2. In a detachable wheel mounting an axle having, near each end thereof, a circumferentially recessed portion cylindrical at its axially outer end and laterally flattened from opposite sides at its axially inner end, a pair of outer segmental shoulders intermediate the ends of said axle portion, and an inner shoulder having a continuous inner edge on said laterally flattened end of said axle portion and a continuous outer edge on a portion of said axle adjacent to said circumferentially recessed portion thereof, a plate metal yoke having open-ended slots in its ends straddling said laterally flattened axle portions and cooperating therewith to secure said axle against rotation about its axis relative to said yoke, said slotted ends of said yoke also cooperating with said outer and inner shoulders to prevent substantial widening and narrowing of the leg spacing of said yoke; a pair of side members associated, respectively, with the legs of said yoke, one of said cylindrical axle portions being received within the aperture of the side member associated with said one leg, and the other of said cylindrical axle portions being received within the aperture of the side member associated with said other leg, and connecting means between said legs and their associated side members retaining the latter in such positions relative to said slots as to secure said axle against transverse movement out of said slots, said connecting means being operable to release said axle for said transverse movement thereof.

3. In a detachable wheel mounting, a wheel, a yoke straddling said wheel and having a slot in each of its legs open at one end and closed at the other, an axle extending through said wheel having a pair of axially spaced shoulders and laterally flattened portions at the axially outer sides, respectively, of said shoulders seated in said slots and cooperating therewith to secure said axle against rotation relative to said yoke, said shoulders having thrust surfaces adapted to bear axially against the inner sides, respectively, of said legs at surface portions of the latter extending radially of said axle, on each leg, from both side edges and from the closed end of the slot therein; means including locking elements connected, respectively, with the legs of said yoke and cooperating with said axle for releasably locking said axle against transverse movement out of said slots; and bearing means independent of said yoke, cooperating with said wheel and axle to retain said wheel and axle rotatably upon and in axially fixed position relative to each other.

4. In a detachable wheel mounting, a wheel, a yoke straddling said wheel and having a slot in each of its legs open at one end and closed at the other, an axle rotatably mounted in said wheel having a pair of axially spaced inner and outer shoulders at each end thereof and laterally flattened portions between each pair of shoulders, seated, respectively, in said slots and cooperating therewith to secure said axle against rotation relative to said yoke, said inner shoulders being formed to abut the inner sides, respectively, of said legs at surface portions of the latter extending radially of said axle, on each leg, from both side edges and from the closed end of the slot therein, and said outer shoulders being formed to abut the outer sides, respectively, of said legs at surface portions of the latter extending radially of said axle, on each leg, from the side edges only of the slot therein; and means including locking elements connected, respectively, with the legs of said yoke and cooperating with said axle for releasably locking said axle against transverse movement out of said slots.

5. In a detachable wheel mounting, a wheel, an axle extending through said wheel and having an externally threaded portion intermediate its ends, bearing means including an internally threaded abutment screwed upon said threaded axle portion, for retaining said axle and wheel rotatably upon and in axially fixed position relative to each other, said axle having laterally flattened portions at opposite sides, respectively, of said wheel and being reduced in diameter at least at one side of said threaded portion to permit free axial movement of said abutment over one of said flattened axle portions, a yoke having open-ended slots in its ends straddling said laterally flattened axle portions and cooperating therewith to secure said axle against rotation about its axis and against axial displacement relative to said yoke, and means including locking elements connected, respectively, with the legs of said yoke and cooperating with said axle, for releasably locking said axle against transverse movement out of said slots.

6. In a detachable wheel mounting, an axle support having a pair of relatively spaced legs, an axle having an externally threaded portion between said legs and an unthreaded end portion extending axially from said threaded axle portion and engaging one of said legs, means including an element cooperating with said unthreaded axle portion for detachably connecting said support and axle, a wheel surrounding said axle between said legs, adjustable bearing means rotatably connecting said axle and wheel, and means for adjusting said bearing means including an internally threaded abutment screwed upon said externally threaded axle portion, said unthreaded end portion of said axle being circumferentially reduced relative to said threaded axle portion, whereby said abutment, upon detachment of said axle from said support, may be unscrewed from said threaded axle portion and removed from said axle by free axial movement thereof over said unthreaded end portion of said axle.

WALTER F. STREHLOW.